United States Patent
Li et al.

(10) Patent No.: US 10,334,596 B2
(45) Date of Patent: Jun. 25, 2019

(54) NETWORK NODE, WIRELESS DEVICE, RESPECTIVE METHOD PERFORMED THEREBY FOR SUPPORTING WIRELESS DEVICE OPERATION IN HETEROGENEOUS FREQUENCY BANDS

(71) Applicant: Telefonaktiebolaget LM Ericsson (publ), Stockholm (SE)

(72) Inventors: Gen Li, Beijing (CN); Jinhua Liu, Beijing (CN); Zhan Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 81 days.

(21) Appl. No.: 15/116,916

(22) PCT Filed: Jan. 28, 2014

(86) PCT No.: PCT/CN2014/071703
§ 371 (c)(1),
(2) Date: Aug. 5, 2016

(87) PCT Pub. No.: WO2015/113226
PCT Pub. Date: Aug. 6, 2015

(65) Prior Publication Data
US 2017/0118758 A1  Apr. 27, 2017

(51) Int. Cl.
*H04W 72/04* (2009.01)
*H04W 16/14* (2009.01)
(Continued)

(52) U.S. Cl.
CPC ......... *H04W 72/0453* (2013.01); *H04L 45/22* (2013.01); *H04L 45/24* (2013.01);
(Continued)

(58) Field of Classification Search
CPC ........ H04L 45/22; H04L 45/24; H04W 16/14; H04W 36/0072; H04W 40/12; H04W 72/0453; H04W 72/10; H04W 72/0833
See application file for complete search history.

(56) References Cited

U.S. PATENT DOCUMENTS

2007/0054622 A1   3/2007 Berkman
2007/0232312 A1*  10/2007 Gallagher ......... H04M 3/42246
                                                    455/436
(Continued)

FOREIGN PATENT DOCUMENTS

CN    101371511    2/2009
CN    101686534    3/2010
(Continued)

OTHER PUBLICATIONS

Extended European Search Report for Application No./Patent No. 14880798.5-1853 / 3100554 PCT/CN2014071703—dated Dec. 5, 2017.
(Continued)

*Primary Examiner* — Gary Mui
(74) *Attorney, Agent, or Firm* — Sage Patent Group

(57) ABSTRACT

A network node, a wireless device and a respective method performed by the same in a wireless communication network employing heterogeneous frequency band types, the network node being operative to serve wireless devices in a non-licensed frequency band and in a licensed frequency band, the network node serving a wireless device in a non-licensed frequency band are provided. The method in the network node comprises configuring (110) a fallback carrier in the licensed frequency band to the wireless device, wherein if the network node determines that the wireless
(Continued)

device should switch to the licensed frequency hand, the method comprises handing over (130) the wireless device to the fallback carrier.

16 Claims, 8 Drawing Sheets

(51) Int. Cl.
    *H04W 40/12*     (2009.01)
    *H04L 12/707*     (2013.01)
    *H04W 36/00*     (2009.01)
    *H04W 72/10*     (2009.01)
    *H04W 74/08*     (2009.01)
    *H04W 88/06*     (2009.01)
    *H04W 28/08*     (2009.01)
    *H04W 72/00*     (2009.01)
    *H04W 48/12*     (2009.01)
    *H04W 48/20*     (2009.01)
    *H04L 5/00*     (2006.01)
    *H04W 84/04*     (2009.01)
    *H04W 36/14*     (2009.01)

(52) U.S. Cl.
    CPC ....... *H04W 16/14* (2013.01); *H04W 36/0072* (2013.01); *H04W 40/12* (2013.01); *H04W 72/10* (2013.01); *H04W 74/0833* (2013.01); *H04L 5/0053* (2013.01); *H04L 5/0073* (2013.01); *H04W 28/08* (2013.01); *H04W 36/14* (2013.01); *H04W 48/12* (2013.01); *H04W 48/20* (2013.01); *H04W 72/00* (2013.01); *H04W 84/04* (2013.01); *H04W 88/06* (2013.01)

(56) References Cited

U.S. PATENT DOCUMENTS

| | | | | |
|---|---|---|---|---|
| 2012/0009923 | A1* | 1/2012 | Chen | H04L 5/0053 455/434 |
| 2012/0039284 | A1* | 2/2012 | Barbieri | H04W 48/10 370/329 |
| 2012/0063383 | A1 | 3/2012 | Barbieri et al. | |
| 2012/0213058 | A1* | 8/2012 | Duan | H04W 74/0841 370/221 |
| 2013/0083772 | A1* | 4/2013 | Hata | H04W 76/19 370/331 |
| 2013/0155991 | A1 | 6/2013 | Kazmi et al. | |
| 2013/0165134 | A1* | 6/2013 | Touag | H04W 72/0486 455/452.1 |
| 2013/0337821 | A1* | 12/2013 | Clegg | H04L 5/0062 455/452.1 |
| 2014/0080483 | A1* | 3/2014 | Elsherif | H04W 36/22 455/436 |
| 2014/0308954 | A1* | 10/2014 | Wang | H04W 36/165 455/436 |
| 2015/0049707 | A1* | 2/2015 | Vajapeyam | H04W 24/10 370/329 |
| 2015/0055541 | A1* | 2/2015 | Zhang | H04W 72/005 370/312 |
| 2015/0350965 | A1* | 12/2015 | Kabadi | H04W 36/0022 370/331 |
| 2016/0088485 | A1* | 3/2016 | Guo | H04W 16/14 370/329 |

FOREIGN PATENT DOCUMENTS

| | | |
|---|---|---|
| CN | 101772087 | 7/2010 |
| CN | 103168491 | 6/2013 |
| CN | 103430606 | 12/2013 |
| WO | WO 2012028254 | 3/2012 |

OTHER PUBLICATIONS

International Search Report for International application No. PCT/CN2014/071703—dated Oct. 27, 2014.
PCT Written Opinion of the International Searching Authority for International application No. PCT/CN2014/071703—dated Oct. 27, 2014.
Communication Pursuant to Rule 164(1) EPC; Partial Supplementary European Search Report for Application No./Patent No. 14880798.5-1853 / 3100554 PCT/CN2014071703–dated Sep. 1, 2017.
Communication Pursuant to Article 94(3) EPC issued by the EPO for Application No. 14 880 798.5-1213—dated Jul. 5, 2018.

* cited by examiner

NETWORK NODE, WIRELESS DEVICE, RESPECTIVE METHOD PERFORMED THEREBY FOR SUPPORTING WIRELESS DEVICE OPERATION IN HETEROGENEOUS FREQUENCY BANDS

PRIORITY

This nonprovisional application is a U.S. National Stage Filing under 35 U.S.C. § 371 of International Patent Application Serial No. PCT/CN2014/071703, filed Jan. 28, 2014, and entitled "Network Node, Wireless Device, Respective Method Performed Thereby For Supporting Wireless Device Operation in Heterogeneous Frequency Bands."

TECHNICAL FIELD

The present disclosure relates to wireless communication networks and in particular to wireless communication networks operating in heterogeneous frequency bands.

BACKGROUND

The number or users of communication networks and especially wireless communication networks is ever increasing. Further, the number of wireless devices that a user may use in order to make of services offered by the communication networks is increasing. This puts increasing demand on capacity and resources of the communication networks. In order to meet the increasing demands, small cells or low power radio base stations providing radio coverage within a limited area are supposed to be increasingly popular in real deployments. Networks comprising both so-called macro radio base stations and low power radio base stations are generally referred to as heterogeneous networks, or hetnets. A macro radio base station is a "full power" radio base station, i.e. a regular radio base station as in a homogenous wireless communication network where all the radio base stations have approximately similar or the same output power. A low power radio base station is generally placed within the coverage area, also referred to as cell, of the macro radio base station and this the cell of the low power radio base station is at least partly overlapping with the cell of the macro radio base station.

Since the coverage areas, or cells, of the macro radio base station and at least one low power radio base station is at least partly overlapping, interference may become a problem and a limitation as to how many low power radio base stations may be employed within the coverage area of a macro radio base station, also referred to as macro cell. Thus, even though low power radio base stations employed within a macro cell may increase the data rates, capacity and/or resources within the macro cell, it might not be enough in order to meet the requirements and demands posed on the wireless network in that macro cell.

SUMMARY

The object is to obviate at least some of the problems outlined above. In particular, it is an object to provide a network node and a method performed by a network node in a wireless communication network employing heterogeneous frequency band types, the network node being operative to serve wireless devices in a non-licensed frequency band and in a licensed frequency band, the network node serving a wireless device in a non-licensed frequency band. It is further an object to provide a wireless device and a method performed by a wireless device operative in a wireless communication network employing heterogeneous frequency bands, the wireless device performing a random access control procedure to become connected to a network node. These objects and others may be obtained by providing a network node, a wireless device and a respective method performed by a network node and a wireless device according to the independent claims attached below.

According to an aspect a method performed by a network node in a wireless communication network employing heterogeneous frequency band types, the network node being operative to serve wireless devices in a non-licensed frequency band and in a licensed frequency band, the network node serving a wireless device in a non-licensed frequency band is provided. The method comprises configuring a fallback carrier in the licensed frequency band to the wireless device, wherein if the network node determines that the wireless device should switch to the licensed frequency band, the method comprises handing over the wireless device to the fallback carrier.

According to an aspect, method performed by a wireless device operative in a wireless communication network employing heterogeneous frequency bands, the wireless device performing a random access control procedure to become connected to a network node is provided. The method comprises receiving information from the network node comprising parameters comprising information pertaining to carrier frequency and band type, and selecting a carrier of a frequency band type offered by the network node to camp on based on the received information According to an aspect, a network node in a wireless communication network employing heterogeneous frequency band types, the network node being operative to serve wireless devices in a non-licensed frequency band and in a licensed frequency band, the network node serving a wireless device in a non-licensed frequency band is provided. The network node comprises a processor and a memory, the memory comprising instructions which when executed by the processor causes the network node to configure a fallback carrier in the licensed frequency band to the wireless device, wherein if the network node determines that the wireless device should switch to the licensed frequency band, the instructions in the memory causes, when executed by the processor, the network node to hand over the wireless device to the fallback carrier.

According to an aspect, a wireless device operative in a wireless communication network employing heterogeneous frequency bands, the wireless device performing a random access control procedure to become connected to a network node is provided. The wireless device comprises a processor and a memory, the memory comprising instructions which when executed by the processor causes the wireless device to receive information from the network node comprising parameters comprising information pertaining to carrier frequency and band type, and to select a carrier of a frequency band type offered by the network node to camp on based on the received information.

The network node in the wireless communication network employing heterogeneous frequency band types, the method performed by the network node, the wireless device operative in a wireless communication network employing heterogeneous frequency bands and the method performed by the wireless device may all have the same advantages. One possible advantage is that the wireless device may remain served by the network node, or another network node, in the licensed frequency band in case the non-licensed frequency band becomes unavailable. It may thus be possible to avoid losing the connection with the wireless device which enhances user experience and avoids resource demanding cell reselection procedure. Another possible advantage is load balancing by configuring different fallback licensed carriers for different wireless devices. In this way, situations where all the wireless devices will access the same licensed which may incur congestion may be avoided. Still a possible advantage is that QoS for different types of services may be guaranteed.

BRIEF DESCRIPTION OF DRAWINGS

Embodiments will now be described in more detail in relation to the accompanying drawings, in which.

DETAILED DESCRIPTION

Figure 1A:
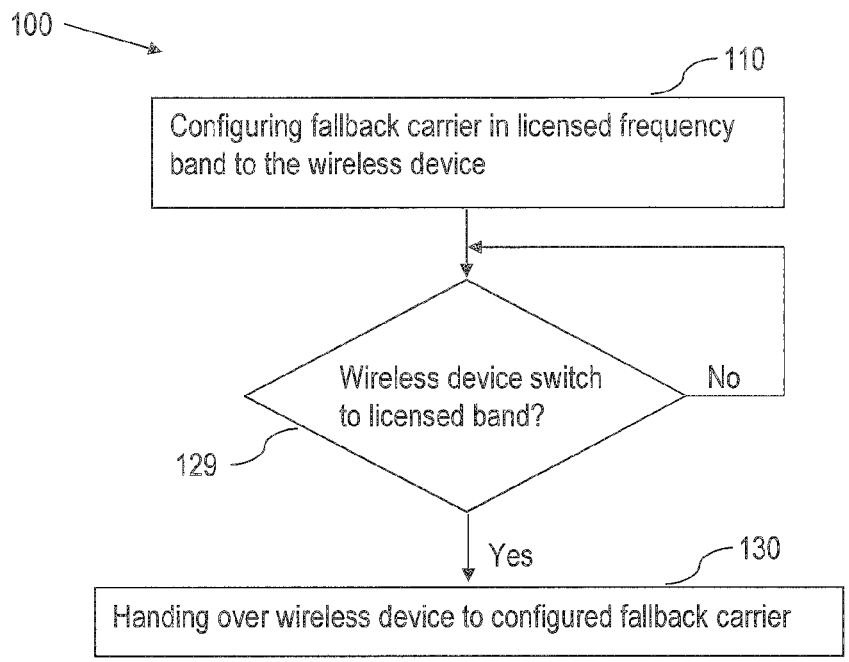
FIG. 1a is a flowchart of a method performed by a network node in a wireless communication network employing heterogeneous frequency band types according to an exemplifying embodiment.

Briefly described, a network node and a method performed by a network node in a wireless communication network employing heterogeneous frequency band types, the network node being operative to serve wireless devices in a non-licensed frequency band and in a licensed frequency band, the network node serving a wireless device in a non-licensed frequency band are provided. Further, a wireless device and a method performed by a wireless device operative in a wireless communication network employing heterogeneous frequency bands, the wireless device performing a random access control procedure to become connected to a network node are provided.

In order to increase capacity and/or resources of a communication network, the network support communication both in a non-licensed frequency band and in a licensed frequency band.

A Licensed frequency band is also referred to as an Authorised Shared Access, ASA, band. There are different types of non-licensed frequency bands, e.g. Licensed Shared Access, LSA, and un-licensed frequency band.

Generally, a wireless communication network operates on a licensed frequency band. This frequency band is limited and may thus become insufficient to meet the increasing demands and requirements of the communication networks.

One solution to offer increased capacity and/or resources may thus be to make use of shared frequency bands for traffic-offloading in future, e.g. in Europe Authorised Shared Access, ASA,/Licensed Shared Access, LSA, may be considered for 2.3-2.4 GHz and in the US it is applicable to the 3.5 GHz process.

Employing heterogeneous frequency bands may be performed within a radio base station so that one and the same radio base station may support communication both in a non-licensed frequency band and in a licensed frequency band. Another alternative is e.g. to let the macro radio base stations use the licensed frequency band and let the low power radio base stations use the non-licensed frequency band.

A wireless device may be capable of operating at frequency bands with different types (e.g. licensed, non-licensed bands) simultaneously, or at a different time. When the wireless device is served by an operator utilising heterogeneous band with one radio access technology, RAT, it is necessary to provide a solution on how to use of specific types of bands at different situations. Throughout this disclosure, LTE will be used as an illustrative example of RAT. However, these illustrative examples should not be seen as only applicable systems.

LSA is a complementary way of authorising and accessing spectrum, i.e. frequency resources, in addition to licensed (exclusive) and license-exempt (unlicensed). In some frequency bands there may be underutilisation of the spectrum resources either in time, geography, and/or frequency. LSA may allow such spectrum to be used much more efficiently and flexibly.

From network side, there may be a LSA controller. The LSA controller retrieves the information about spectrum made available under an LSA scheme from an LSA repository of the incumbent spectrum user and therefore has information on the available spectrum in any given location where its radio base stations are sited. Under this scheme, the base stations may be allowed to transmit in the LSA band only where the LSA controller indicates that the spectrum is available and no harmful interference is caused to the incumbent.

Wireless communication networks, e.g. LTE, only use licensed band for network services its LTE nodes (i.e. evolved Node B, eNB, and User Equipment, UE) take licensed operating band as granted always, i.e. LTE systems are the exclusive primary systems and thus hold total controllability in licensed exclusive band.

However, for non-licensed band, it may not be as reliable as the licensed exclusive band according to LSA operation rules. Taking 3.5 GHz as one example, there will be shipping Radar systems as incumbent spectrum user in the USA. At certain time, the low power radio base station is operating on this LSA carrier while the shipping Radar systems are moving near. Hence the LSA controller will receive the information the band is not available. Then the low power radio base station must stop using that LSA carrier for transmission immediately. This procedure is transparent to wireless devices connected to this low power radio base station. In other words, wireless devices which lose connection may blindly run the cell reselection procedure. This procedure (i.e. frequency search and measurement) brings quite considerable service interruption which may impact the end user experience.

There may be some additional signalling format change on measurement, reporting procedure or power control (e.g. primary system detection request) which is not needed in licensed band. For new wireless devices supporting licensed band and non-licensed band simultaneously, they may not be able to decide if there is need to do this without knowledge of band type.

By deploying wireless communication networks in heterogeneous bands (i.e. in both licensed band and non-unlicensed band), different eNBs may be operating on different types of band or even the same eNB on multiple bands with different types.

Embodiments herein relates to a method performed by a network node in a wireless communication network employing heterogeneous frequency band types. Such a method will now be described with reference to FIGS. 1a-1e.

The network node is operative to serve wireless devices in a non-licensed frequency band and in a licensed frequency band; the network node is serving a wireless device in a non-licensed frequency band. FIG. 1a illustrates the method comprising configuring 110 a fallback carrier in the licensed frequency band to the wireless device, wherein if the network node determines that the wireless device should switch to the licensed frequency band, the method comprises handing over 130 the wireless device to the fallback carrier.

The network node may support both licensed and non-licensed frequency band. At one point in time, the network node serves the wireless device in the non-licensed frequency band. As described above, the wireless communication system in which the network node is employed may not be in control of the non-licensed frequency band and may detect at any time (e.g. by receiving information from another node such as e.g. an LSA controller) that the non-licensed frequency band is becoming unavailable. Thus the network node configures a fallback carrier in the licensed frequency band to the wireless device. Since the wireless communication system in which the network node is employed has full control over the licensed frequency band, the wireless network and thus the network node, has full control over the configured fallback carrier.

During a point in time, when the wireless device is being served by the network node in the non-licensed frequency band, the network node determines that the wireless device should switch to the licensed frequency band. This may be determined by the network node receiving information from another node or device that the non-licensed frequency band is becoming unavailable. Thus the wireless device may not continue to use the resource of the non-licensed frequency band.

In response to determining that the wireless device should switch to the licensed frequency band, the network node hands over 130 the wireless device to the fallback carrier in the licensed frequency band.

Figure 1C:
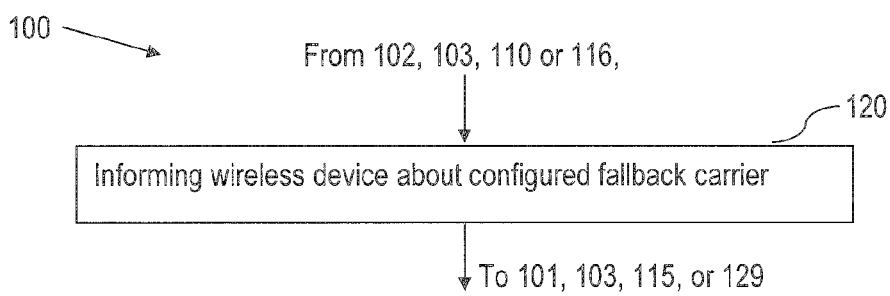
FIG. 1c is a flowchart of a method performed by a network node in a wireless communication network employing heterogeneous frequency band types according to an exemplifying embodiment.
Figure 1B:
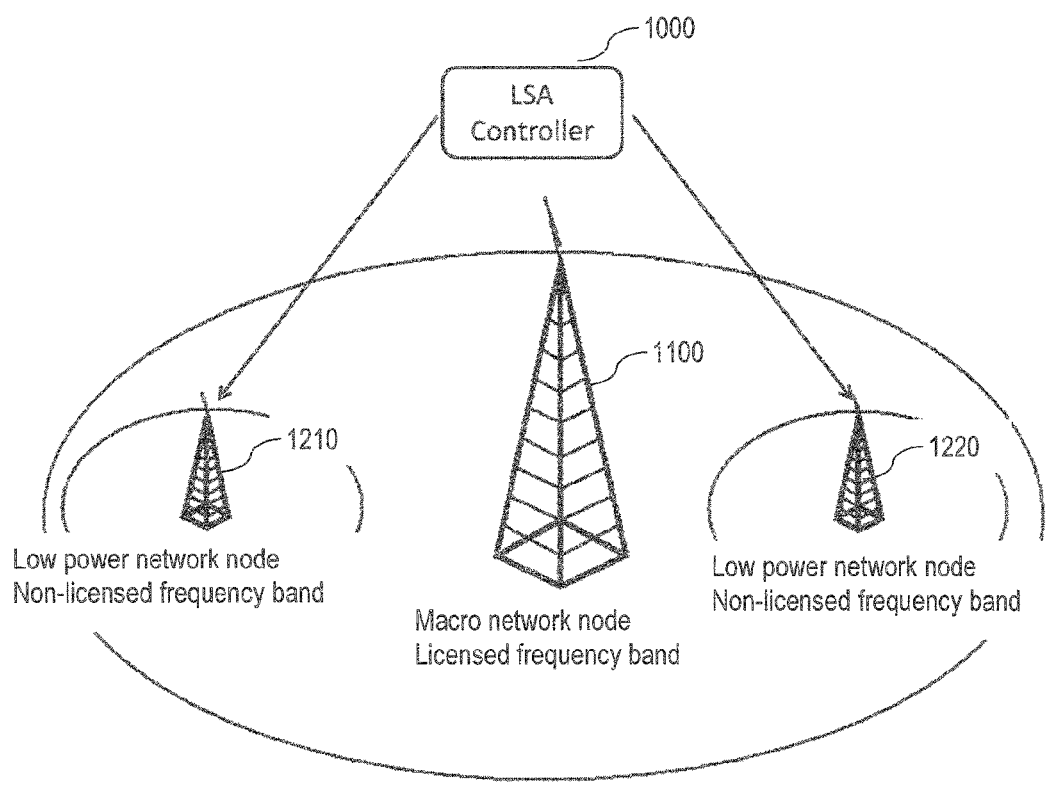
FIG. 1b is a schematic illustration of a communication network operating in heterogeneous frequency band types according to an example.

FIG. 1b illustrates an exemplifying network architecture of a heterogeneous wireless communication network employing heterogeneous frequency band. In this specific example, only low power network nodes 1210 and 1220 operate in non-licensed frequency band, whereas the macro network node 1100 operates in licensed frequency band. It shall be pointed out that this is merely an example, and the method may be implemented in heterogeneous and homogeneous wireless communication networks, and in case of heterogeneous wireless communication networks all network nodes may be operable in both the licensed and the non-licensed frequency band irrespective of the network node being a macro or a low power network node. FIG. 1b also illustrates the heterogeneous wireless communication network employing heterogeneous frequency band comprising a LSA controller 1000. The LSA controller 1000 may be responsible for monitoring the availability of the non-licensed frequency band and in case the non-licensed frequency band is becoming unavailable, the LSA controller 1000 may notify at least network nodes being operable to provide service by means of the non-licensed frequency band.

By configuring the fallback carrier in the licensed frequency band that the wireless device can switch to in case of non-licensed frequency band becoming unavailable, several problems may be solved. Without this solution, when the network node would stop operation on the non-licensed frequency band, the wireless device would trigger the evaluation of out-of-sync and in-sync evaluation. If the wireless device would determine that it is out-of-sync, the wireless device would continue monitoring the downlink radio quality within a configured period (T310 timer), if the synchronisation is recovered then the wireless device would remain to be connected to the network node. However, if the synchronisation is not recovered during the preconfigured period, the wireless device would determine the original radio link is lost and finish the cell reselection procedure within another configured period (T311 timer). After the new target cell or network node is determined, the wireless device would start the access procedure to the new target cell or network node. The whole procedure may take several seconds.

The method performed by the network node may have several advantages. One possible advantage is that the wireless device may remain served by the network node, or another network node, in the licensed frequency band in case the non-licensed frequency band becomes unavailable. It may thus be possible to avoid losing the connection with the wireless device which enhances user experience and avoids resource demanding cell reselection procedure. Another possible advantage is load balancing by configuring different fallback licensed carriers for different wireless devices. In this way, situations where all the wireless devices will access the same licensed which may incur congestion may be avoided. Still a possible advantage is that QoS for different types of services may be guaranteed.

The method may further comprise informing 120 the wireless device about the configured fallback carrier. This is also illustrated in FIG. 1c.

The wireless device may be informed about the configured fallback carrier in various ways, both explicitly and implicitly. An example of explicit informing the wireless device is by signalling information about the fallback carrier to the wireless device. Signalling the information to the wireless device may be done in different ways as will be described in more detail below.

The fallback carrier may be a predefined primary carrier.

This is an example of informing the wireless device implicitly. If the fallback carrier is a predefined primary carrier, then the wireless device already has knowledge about the fallback carrier. One example of the wireless device already having knowledge about the fallback carrier is by obtaining the information from system information.

Usually, by a conventional cell-search procedure, a wireless device synchronises to a radio base station or cell, acquires the physical-layer identity of the cell, and detects the cell frame timing. Once this has been achieved, the wireless device has to acquire the cell system information. This is information repeatedly broadcasted by the network, which needs to be acquired by wireless devices to facilitate channel access within a specific cell.

Generally, system information includes downlink and uplink cell bandwidths, uplink/downlink configuration in the case of Time Division Duplex, TDD, detailed parameters related to random-access transmission and uplink power control, etc. In LTE, system information is delivered by two different mechanisms over two different transport channels. A limited amount of system information, corresponding to the so-called Master-Information Block, MIB, is transmitted using the Broadcast Channel, BCH. The main part of the system information, corresponding to different so-called System-Information Blocks, SIBs, is transmitted using the downlink shared channel, DL-SCH.

The method may further comprise receiving 115, from the wireless device, a request for frequency band type of a carrier by means of which the wireless device is connected to the network node, wherein the method further comprises informing 116 the wireless device of the frequency band type of the carrier.

Figure 1D:
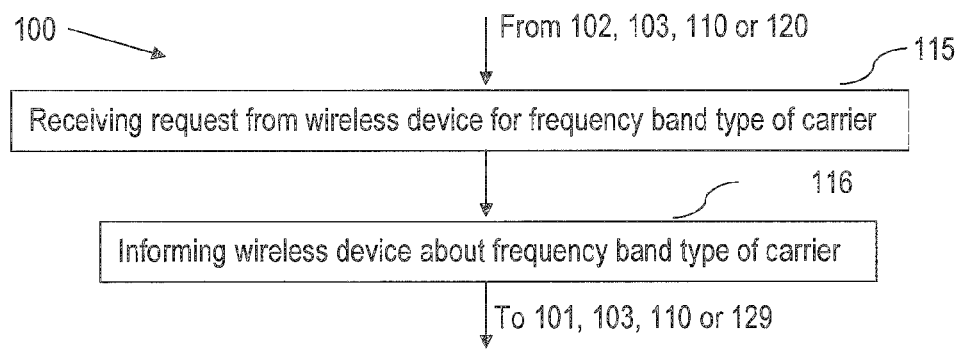
FIG. 1d is a flowchart of a method performed by a network node in a wireless communication network employing heterogeneous frequency band types according to still an exemplifying embodiment.

As described above, there may be some additional signalling format change on measurement, reporting procedure or power control (e.g. primary system detection request) which is not needed in licensed band. For new wireless devices supporting licensed band and non-licensed band simultaneously, they may not be able to decide if there is need to do this without knowledge of band type. Thus a wireless device may send a request for information about frequency band type of the carrier by means of which the wireless device is connected to the network node. This is received 115 by the network node, which subsequently informs 116 the wireless device of the frequency band type of the carrier, see also FIG. 1d. FIG. 1d illustrates that this may happen at different points in time, which is illustrated in FIG. 1d and subsequently also in FIGS. 1e and 1f by arrows indicating "from XXX, YYY" and the arrows "to ZZZ, CCC". This is to illustrate that all actions and/or events possibly taking place may do so in different orders so that one has not necessarily have to occur before another.

Figure 1E:
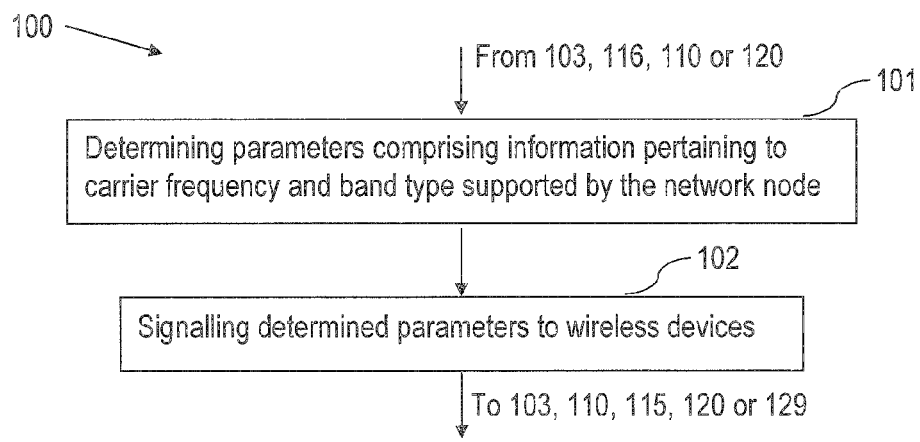
FIG. 1e is a flowchart of a method performed by a network node in a wireless communication network employing heterogeneous frequency band types according to yet an exemplifying embodiment.

Still further, as illustrated in FIG. 1e, the method may comprise determining 101 parameters comprising information pertaining to carrier frequency and band type supported by the network node, and signalling 102 the determined parameters to wireless devices currently camping on the network node.

According to an embodiment, signalling 102 the determined parameters to the wireless devices currently camping on the network node comprises broadcasting the determined parameters in a Master Information Block, MIB and/or transmitting the determined parameters in a System Information Block, SIB, the parameters.

As described above, a network node may signal information to wireless devices by broadcasting MIB on a BCH and/or transmitting SIB on a DL-SCH. Another way to signalling information to the wireless device is by means of Resource Radio Control, RCC, signalling. Generally, cell specific information is signalled by means of MIB and/or SIB and information specific for the wireless device is signalled by means of RRC signalling. In this manner, a wireless device may be able to select a network node and/or a carrier in the licensed or non-licensed frequency band based on the parameters comprising information pertaining to carrier frequency and band type supported by the network node. It may be that not all network nodes support all different frequencies in the non-licensed frequency band. By determining and signalling this information to the wireless device, the wireless device may make a choice of carrier dependent on e.g. how delay tolerant the service is that the wireless device wishes to engage in.

Figure 1F:
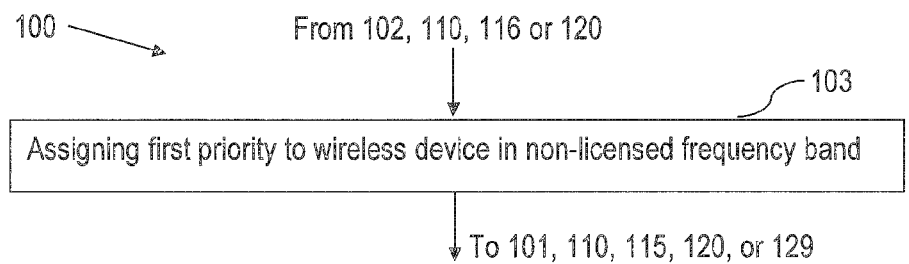
FIG. 1f is a flowchart of a method performed by a network node in a wireless communication network employing heterogeneous frequency band types according to another exemplifying embodiment.

The method may further comprise assigning 103 a first priority of the served wireless device in the non-licensed frequency band, the first priority being higher than a second priority assigned to a second wireless device engaged in an initial random access control procedure, wherein if the non-licensed frequency band becomes unavailable, the served wireless device is prioritised before the second wireless device with regards to the configured fallback carrier, see also FIG. 1f.

A situation may arise where the network node has to prioritise between different wireless devices, e.g. when the network node becomes heavily loaded and/or when frequency resources are running low. By assigning a higher priority to the wireless device currently being served by means of the non-licensed frequency band than to the wireless device currently engaged in the initial random access control procedure, the wireless device already being served by the network node will not be dropped in case e.g. frequency resources are running low. The wireless device engaged in the initial random access control procedure has not yet become served by the network node. The two wireless devices may have the same, or different, handling priority when it comes to e.g. subscription or quality of service, QoS, but this priority is not regarded when it comes to prioritising between the wireless device currently being served by means of the non-licensed frequency and the wireless device currently engaged in the initial random access control procedure.

In an example where the wireless device currently engaged in the initial random access control procedure has a higher handling or QoS priority than the wireless device currently being served by means of the non-licensed frequency band, the network node may actually instead prioritise the wireless device currently engaged in the initial random access control procedure by assigning a higher priority to the wireless device currently engaged in the initial random access control procedure than the wireless device currently being served by means of the non-licensed frequency band.

The method may further comprise identifying 160 a delay tolerant wireless device being served in the licensed frequency band, and handing over 170 the delay tolerant wireless device to the non-licensed frequency band.

Different wireless device may be engaged in different services. Different services may be more or less delay tolerant. Thus a wireless device being engaged in a delay tolerant service may be referred to as a delay tolerant wireless device. Similarly, a wireless device being engaged in a delay sensitive service may be referred to as a delay sensitive wireless device. Since the communication network is in control over the licensed frequency band but have less control, or is out of control, over the non-licensed frequency band, it may be preferable to have as many wireless devices as possible being served by means of the licensed frequency band. However, if the resources of the licensed frequency band are running low, then some wireless devices may need to be served by means of the non-licensed frequency band. Since the communication network is in control over the licensed frequency band, it is plausible that wireless devices being served by means of the licensed frequency band may suffer less delay, or is more likely to stay serviced and not dropped. Thus in order to increase the probability that the delay sensitive wireless devices experience good or acceptable quality, they should remain serviced by means of the licensed frequency band as much as possible. Consequently, delay tolerant wireless devices may be handed over to the non-licensed frequency band in order to ensure, or increase probability, that delay sensitive wireless devices remain serviced by means of the licensed frequency band. Thus, the network node identifies a delay tolerant wireless device being served in the licensed frequency band, and hands over the delay tolerant wireless device to the non-licensed frequency band.

Embodiments herein also relate to a method performed by a wireless device operative in a wireless communication network employing heterogeneous frequency bands. Embodiments of such a method will now be described with reference to FIGS. 2a-2c. The wireless device is performing a random access control procedure to become connected to a network node.

Figure 2A:
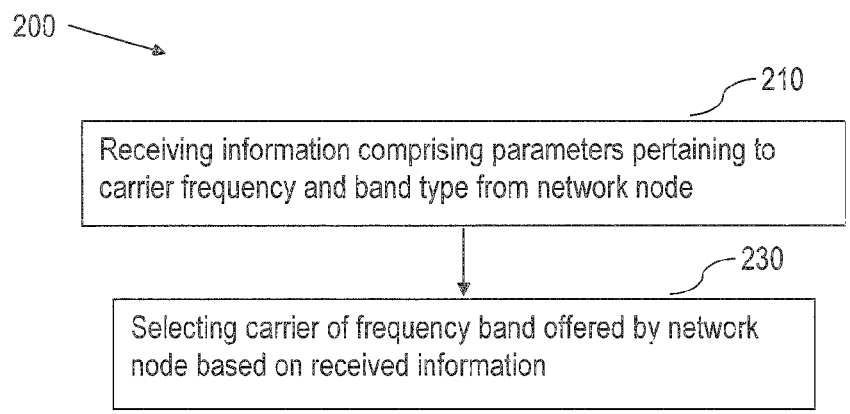
FIG. 2a is a flowchart of a method performed by a wireless device operative in a wireless communication network employing heterogeneous frequency bands according to an exemplifying embodiment.

FIG. 2a illustrates the method comprising: receiving 210 information from the network node comprising parameters comprising information pertaining to carrier frequency and band type, and selecting 230 a carrier of a frequency band type offered by the network node to camp on based on the received information.

When the wireless device is performing the random access control procedure to become connected to a network node, one task for the wireless device is to select a carrier to use for subsequent use to engage in a service provided by means of a wireless communication network of which the network node is comprised. There may be a plurality of different parameters and/or factors that form a basis by means of which different carriers are more or less suitable to use for the service the wireless device will engage in. Thus, the wireless device receives information from the network node about available and/or offered carrier frequency and frequency band type. Based at least partially on the frequency band type and carrier frequency available and/or offered by the network node, the wireless device selects a carrier of a frequency band type offered by the network node to camp on.

The method performed by the wireless device may have the same and/or similar advantages as those of the method performed by the network node. One possible advantage is that the wireless device may remain served by the network node, or another network node, in the licensed frequency band in case the non-licensed frequency band becomes unavailable. It may thus be possible to avoid losing the connection with the wireless device which enhances user experience and avoids resource demanding cell reselection procedure. Another possible advantage is load balancing by configuring different fallback licensed carriers for different wireless devices. In this way, situations where all the wireless devices will access the same licensed which may incur congestion may be avoided. Still a possible advantage is that QoS for different types of services may be guaranteed.

The method may further comprising determining 220 a Quality Of Service, QoS, Class of a service the wireless device intends to engage in, wherein selecting 230 the carrier of the frequency band type further is based on the determined QoS.

As briefly described above, there may be a plurality of different parameters and/or factors that form a basis by means of which different carriers are more or less suitable to use for the service the wireless device will engage in. The QoS class is an example of such a parameter and/or factor. The QoS class may for example indicate that the service is delay tolerant or delay sensitive, which may affect the suitability of the different frequency bands.

According to an embodiment, the wireless device is being served by the network node by means of a carrier in the non-licensed frequency band, wherein the method comprises determining 240 a fallback carrier in the licensed frequency band.

The wireless device has in this embodiment become served by the network node. In conjunction to becoming served or after having becoming served, the wireless device determines a fallback carrier in the licensed frequency band. The wireless device may determine the fallback carrier by receiving information from the network node in different ways. As described above, the network node may signal the fallback carrier by means of e.g. broadcasting MIBs on the BCH, transmitting system information in SIBs on the DL-SCH and/or transmitting RRC signalling to the wireless device. Thus, once the wireless device receives the information about the fallback carrier, the wireless device can be said to determine the fallback carrier.

The method may further comprise determining 250 that the non-licensed frequency band is becoming unavailable and accessing 260 the determined fallback carrier.

At a point in time when the wireless device is being served by the network node by means of a carrier in the non-licensed frequency band, the wireless device determines that the non-licensed frequency band is becoming unavailable. The determination may be done in different ways as will be exemplified in more detail below. One example is illustrated in FIG. 1b, where the LSA controller 1000 informs the network node about the fact that the non-licensed frequency band is becoming unavailable. Upon determining that the non-licensed frequency band is becoming unavailable, the wireless device accesses the determined fallback carrier. In this manner, the wireless device avoids its connection to the network node, by means of the carrier in the non-licensed frequency band, is lost or dropped when the carrier in the non-licensed frequency band becomes unavailable.

Determining 250 that the non-licensed frequency band is becoming unavailable may comprise determining that a monitored pilot quality of the non-licensed frequency band has fallen below a threshold.

This is another example of how to determine that the carrier in the non-licensed frequency band is becoming unavailable. The wireless device may measure pilot signals and/or reference signals transmitted from the network node. The network node may transmit pilot signals and/or reference signals both in the licensed and the non-licensed frequency band. By monitoring and/or measuring the quality of pilot signals and/or reference signals transmitted by the network node in the non-licensed frequency band, the wireless device may detect that the quality falls below the threshold.

Determining 250 that the non-licensed frequency band is becoming unavailable may comprise determining that the wireless device has not been scheduled for a predetermined period of time.

This is still a further example of how to determine that the carrier in the non-licensed frequency band is becoming unavailable. When the wireless device is being served by the network node by means of the carrier in the non-licensed frequency band, the wireless device may both transmit and receive data. Generally, a wireless device may not transmit data in uplink freely, but instead requests a scheduling grant which tells the wireless device e.g. when the wireless device may transmit data in uplink. It shall be pointed out that the wireless device may not need to actively send requests for scheduling grants. The scheduling grants may be sent to the wireless device from the network node without the wireless device actively having to request them.

If the wireless device is not scheduled for a predetermined period of time, i.e. does not receive a scheduling grant from the network node, the wireless devices determines that the non-licensed frequency band is becoming unavailable and hence accesses the determined fallback carrier.

Wireless communication network nodes (e.g. an eNB, radio base station and wireless devices) initialising operation in heterogeneous frequency bands should first be aware of the operating carrier's frequency band type. A network node such as e.g. an eNB or a radio base station may check an Operation and Maintenance, O&A, preconfigured database to know the exact band type. Wireless devices may obtain such information in multiple ways as described above, e.g. by predefinitions at manufacturing, cell-specific broadcast information, or UE-specific RRC signalling, or even stored information in SIM cards.

For a wireless device served in non-licensed frequency bands, the network node configures a fallback carrier, which may be a carrier in the licensed frequency band or cell operating or providing carriers in the licensed frequency band. The fallback carrier or cell may admit the fallback wireless device with higher priority than an initial access wireless device with the traffic of same handling priority. The network node may shift delay tolerant wireless device(s) to non-licensed frequency band carriers.

When a wireless device is aware that it is served by an unlicensed frequency band carrier, the following procedures can be carried out to ensure the user experience. (1) Fallback carrier procedure: the wireless device maintains one or multiple several backup licensed carriers to enable fast cell reselection at served carrier unavailable. (2) QoS-oriented cell selection/reselection: in practice, different services require different QoS and the user experience impairment is different at service interruption. As a solution, a wireless device with only delay-tolerant service is ok to be served by unlicensed frequency band carrier while a wireless device with delay-sensitive services is more preferred served by licensed frequency band carrier. An alternative solution is to configure a larger offset for cell selection/reselection to guarantee most of wireless devices can camp on licensed frequency band carrier. (3) Adjustment for signalling: When wireless devices know the operating carrier is non-licensed, they will enable the additional signalling format on measurement, reporting procedure or power control (e.g. primary detection measurement request); Otherwise, remain the legacy signalling procedure.

The network node may know the band type (e.g. licensed or non-licensed) according to a pre-configuration or acquire band type information via O&A preconfigured database indicating that of each potential operating carrier.

A wireless device may be informed of the band type by one of the following ways. (1) Predefined band type list on the wireless device side, e.g. a mapping table between carrier frequency and band type stored information in the wireless device or the Subscriber Identity Module, SIM, card. (2) Cell-specific information periodically broadcasted by the network node, e.g. MIB or SIB information. For example, one more information element, IE, cellCarrierType in SIB1 may be added to indicate the carrier frequency band type of the network node or cell. There may be a one to one mapping between cellCarrierType and cellIdentity. Here cellCarrierType may use '0' as licensed and '1' as non-licensed. (3) If there is no stored frequency band type information in the wireless device for its serving network node, the wireless device may request the network node to provide frequency band type information. Then the network node may send the information, e.g. through RRC signalling. Finally the wireless device may store the information (carrier range and type).

Thus, for a wireless device served by non-licensed frequency band carrier only, the wireless device may maintain one or multiple several configured fallback carriers (licensed carrier preferred) to enable fast cell reselection when served carrier (in non-licensed frequency band) is becoming unavailable.

As described above, wireless devices may be classified into two classes: low QoS requirement (delay-tolerant) wireless device and high QoS requirement (delay-sensitive) wireless device. The wireless devices may select a network node or cell having the highest reference signal strength or lowest path loss. In this way, a high QoS requirement (delay-sensitive) wireless device in some cases may probably prefer camping on a carrier in the licensed frequency band.

Assume a wireless device is not aware of frequency band type and selects a non-licensed one to camp on. When it becomes unavailable at some time, the wireless device may have to spend time to perform inter-frequency cell reselection, which includes re-doing a time-consuming frequency-searching procedure. Thus, QoS of access initiated by those wireless devices cannot be guaranteed. Thus, if it is a delay sensitive wireless device (meaning it can initiate delay sensitive service), then (a) if there are only network nodes (or cells) providing non-licensed frequency band carriers found by the wireless device, just select a carrier in the non-licensed frequency band to camp on, or (b) if there are network nodes (or cells) providing carriers in licensed and shared frequency band found by the wireless device, select the carrier in the licensed frequency band having the best RSRQ/RSRQ to camp on. If it is a delay tolerant wireless device, follow current cell selection/reselection rules. Alternatively, another example is to configure a larger offset for cell selection/reselection to guarantee that most of the wireless devices may camp on licensed frequency band carriers, i.e. the wireless devices only select or reselect a non-licensed frequency band carrier to camp on when the RSRP is much better than that in licensed frequency band carrier.

When wireless devices find that a certain candidate operating carrier is in the non-licensed frequency band, they may carry out proper adjustment on signalling format on measurement, reporting procedure or power control. For instance, the network node providing non-licensed band may need the assistance of wireless devices to perform primary system sensing. The network nodes may signal to the wireless devices to request necessary information from the wireless devices and then the wireless devices may report measurements in different format. This signalling is not needed when the network node is operating in licensed band. It is only activated when the wireless devices are aware of that the operating frequency band is a non-licensed one.

Embodiments herein also relate to a network node in a wireless communication network employing heterogeneous frequency band types, the network node being operative to serve wireless devices in a non-licensed frequency band and in a licensed frequency band. The network node has the same objects, technical features and advantages as the method performed by the network node as described above. The network node will hence only be described in brief with reference to FIG. 3 in order to avoid unnecessary repetition. The network node is serving a wireless device in a non-licensed frequency band and is illustrated in FIG. 3.

Figure 3:
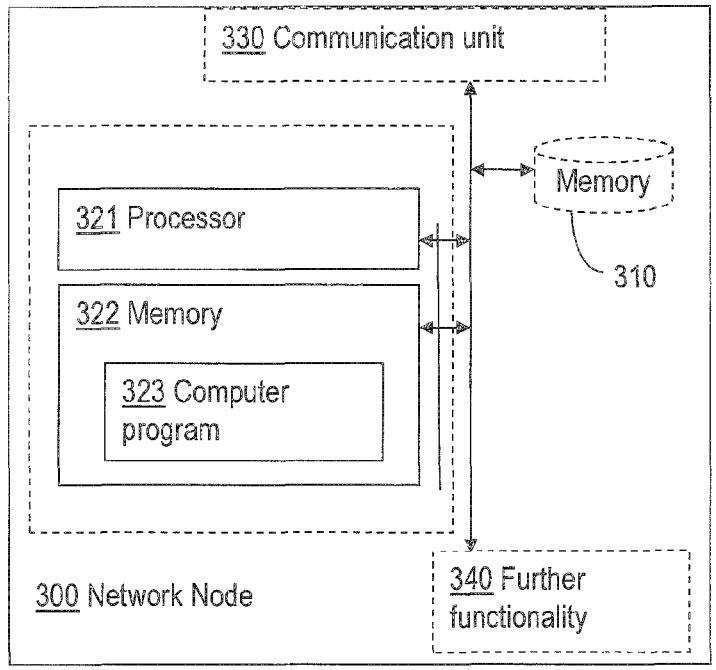
FIG. 3 is a block diagram of a network node in a wireless communication network employing heterogeneous frequency band types according to an exemplifying embodiment.

FIG. 3 illustrates the network node 300 comprising a processor 321 and a memory 322, the memory comprising instructions which when executed by the processor causes the network node 300 to configure a fallback carrier in the licensed frequency band to the wireless device, wherein if the network node determines that the wireless device should switch to the licensed frequency band, the instructions in the memory causes, when executed by the processor, the network node 300 to hand over the wireless device to the fallback carrier.

The network node has the same possible advantage as the method performed by the network node. One possible advantage is that the wireless device may remain served by the network node, or another network node, in the licensed frequency band in case the non-licensed frequency band becomes unavailable. It may thus be possible to avoid losing the connection with the wireless device which enhances user experience and avoids resource demanding cell reselection procedure. Another possible advantage is load balancing by configuring different fallback licensed carriers for different wireless devices. In this way, situations where all the wireless devices will access the same licensed which may incur congestion may be avoided. Still a possible advantage is that QoS for different types of services may be guaranteed.

According to an embodiment, the memory 322 further comprises instructions which when executed by the processor 321 causes the network node 300 to inform the wireless device about the configured fallback carrier.

According to yet an embodiment, the fallback carrier is a predefined primary carrier.

According to still an embodiment, the memory 322 further comprises instructions which when executed by the processor 321 causes the network node 300 to receive, from the wireless device, a request for frequency band type of a carrier by means of which the wireless device is connected to the network node, and to inform the wireless device of the frequency band type of the carrier.

According to another embodiment, the memory 322 further comprises instructions which when executed by the processor 321 causes the network node 300 to determine parameters comprising information pertaining to carrier frequency and band type supported by the network node, and to signal the determined parameters to wireless devices currently camping on the network node.

According to an embodiment, signalling the determined parameters to the wireless devices currently camping on the network node comprises broadcasting the determined parameters in a Master Information Block, MIB and/or transmitting the determined parameters in a System Information Block, SIB, the parameters.

According to yet an embodiment, the memory 322 further comprises instructions which when executed by the processor 321 causes the network node 300 to assign a first priority of the served wireless device in the non-licensed frequency band, the first priority being higher than a second priority assigned to a second wireless device engaged in an initial random access control procedure, wherein if the non-licensed frequency band becomes unavailable, the served wireless device is prioritised before the second wireless device with regards to the configured fallback carrier.

According to still an embodiment, the memory 322 further comprises instructions which when executed by the processor 321 causes the network node 300 to identify a delay tolerant wireless device being served in the licensed frequency band, and to hand over the delay tolerant wireless device to the non-licensed frequency band.

Figure 4:
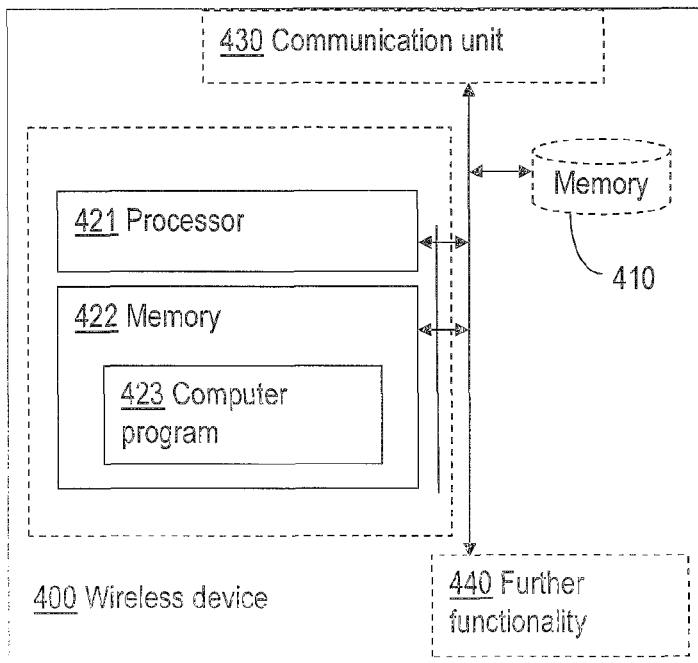
FIG. 4 is a block diagram of a wireless device operative in a wireless communication network employing heterogeneous frequency bands according to an exemplifying embodiment.

Embodiments herein also relate to a wireless device operative in a wireless communication network employing heterogeneous frequency bands, the wireless device performing a random access control procedure to become connected to a network node. The wireless device has the same objects, technical features and advantages as the method performed by the wireless device as described above. The wireless device will hence only be described in brief with reference to FIG. 4 in order to avoid unnecessary repetition. The wireless device 400 is illustrated in FIG. 4 comprising a processor 421 and a memory 422, the memory comprising instructions which when executed by the processor causes the wireless device 400 to receive information from the network node comprising parameters comprising information pertaining to carrier frequency and band type, and to select a carrier of a frequency band type offered by the network node to camp on based on the received information.

The wireless device has the same possible advantage as the method performed by the wireless device. One possible advantage is that the wireless device may remain served by the network node, or another network node, in the licensed frequency band in case the non-licensed frequency band becomes unavailable. It may thus be possible to avoid losing the connection with the wireless device which enhances user experience and avoids resource demanding cell reselection procedure. Another possible advantage is load balancing by configuring different fallback licensed carriers for different wireless devices. In this way, situations where all the wireless devices will access the same licensed which may incur congestion may be avoided. Still a possible advantage is that QoS for different types of services may be guaranteed.

According to an embodiment, the memory 422 further comprises instructions which when executed by the processor 421 causes the wireless device 400 to determine a QoS Class of a service the wireless device intends to engage in, wherein selecting the carrier of the frequency band type further is based on the determined QoS class.

According to still an embodiment, the wireless device is being served by the network node by means of a carrier in the non-licensed frequency band, wherein the memory 422 further comprises instructions which when executed by the processor 421 causes the wireless device 400 to determine a fallback carrier in the licensed frequency band.

According to yet an embodiment, the memory 422 further comprises instructions which when executed by the processor 421 causes the wireless device 400 to determine that the non-licensed frequency band is becoming unavailable and to access the determined fallback carrier.

According to another embodiment, determining that the non-licensed frequency band is becoming unavailable comprises determining that a monitored pilot quality of the non-licensed frequency band has fallen below a threshold.

According to yet an embodiment, determining that the non-licensed frequency band is becoming unavailable comprises determining that the wireless device has not been scheduled for a predetermined period of time.

Embodiments herein also relate to a network node in a wireless communication network employing heterogeneous frequency band types, the network node being operative to serve wireless devices in a non-licensed frequency band and in a licensed frequency band, the network node serving a wireless device in a non-licensed frequency band.

The network node has the same objects, technical features and advantages as the network node and the method performed by the network node as described above. The network node will hence only be described in brief with reference to FIG. 5 in order to avoid unnecessary repetition.

Figure 5:
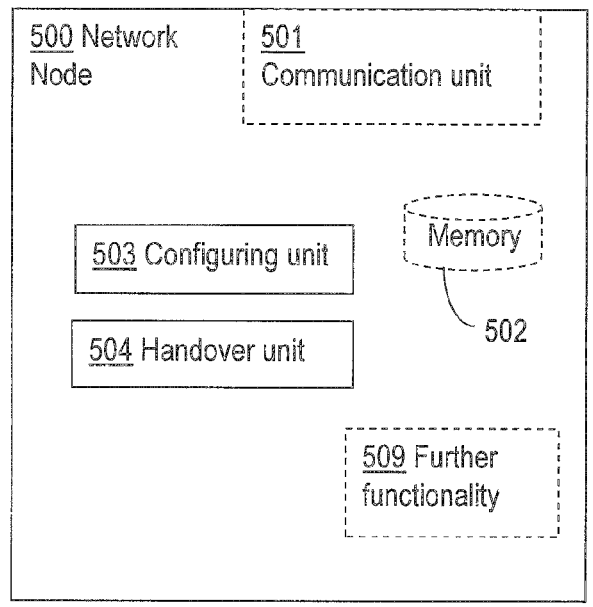
FIG. 5 is a block diagram of a network node in a wireless communication network employing heterogeneous frequency band types according to an exemplifying embodiment.

The network node 500 is illustrated in FIG. 5 comprising a configuring unit 503 for configuring a fallback carrier in the licensed frequency band to the wireless device, wherein if the network node determines that the wireless device should switch to the licensed frequency band, the network node 500 comprises a handing over unit 504 for handing over the wireless device to the fallback carrier.

The network node has the same possible advantage as the method performed by the network node. One possible advantage is that the wireless device may remain served by the network node, or another network node, in the licensed frequency band in case the non-licensed frequency band becomes unavailable. It may thus be possible to avoid losing the connection with the wireless device which enhances user experience and avoids resource demanding cell reselection procedure. Another possible advantage is load balancing by configuring different fallback licensed carriers for different wireless devices. In this way, situations where all the wireless devices will access the same licensed which may incur congestion may be avoided. Still a possible advantage is that QoS for different types of services may be guaranteed.

Embodiments herein also relate to a wireless device operative in a wireless communication network employing heterogeneous frequency bands, the wireless device performing a random access control procedure to become connected to a network node.

The wireless device has the same objects, technical features and advantages as the wireless device and the method performed by the wireless device as described above. The wireless device will hence only be described in brief with reference to FIG. 6 in order to avoid unnecessary repetition.

Figure 6:
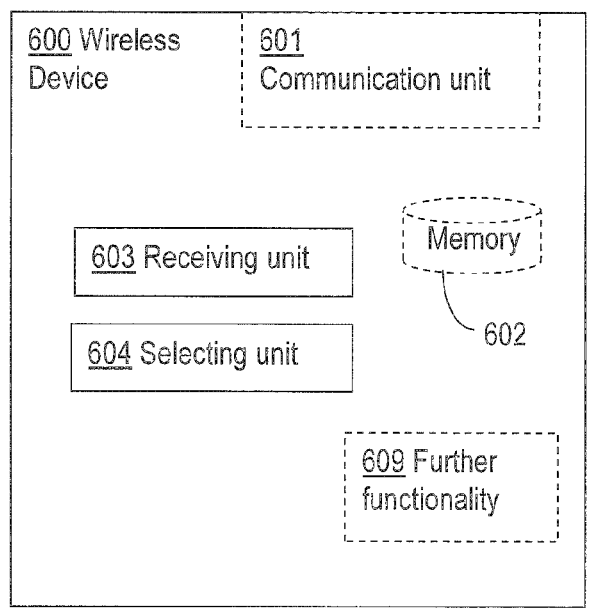
FIG. 6 is a block diagram of a wireless device operative in a wireless communication network employing heterogeneous frequency bands according to an exemplifying embodiment.

The wireless device 600 is illustrated in FIG. 6 comprising a receiving unit 603 for receiving information from the network node comprising parameters comprising information pertaining to carrier frequency and band type, and a selecting unit 604 for selecting a carrier of a frequency band type offered by the network node to camp on based on the received information.

The wireless device has the same possible advantage as the method performed by the wireless device. One possible advantage is that the wireless device may remain served by the network node, or another network node, in the licensed frequency band in case the non-licensed frequency band becomes unavailable. It may thus be possible to avoid losing the connection with the wireless device which enhances user experience and avoids resource demanding cell reselection procedure. Another possible advantage is load balancing by configuring different fallback licensed carriers for different wireless devices. In this way, situations where all the wireless devices will access the same licensed which may incur congestion may be avoided. Still a possible advantage is that QoS for different types of services may be guaranteed.

In FIG. 5, the network node 500 is also illustrated comprising a communication unit 501. Through this unit, the network node 500 is adapted to communicate with other nodes and/or entities in the wireless communication network. The communication unit 501 may comprise more than one receiving arrangement. For example, the communication unit 501 may be connected to both a wire and an antenna, by means of which the network node 500 is enabled to communicate with other nodes and/or entities in the wireless communication network. Similarly, the communication unit 501 may comprise more than one transmitting arrangement, which in turn are connected to both a wire and an antenna, by means of which the network node 500 is enabled to communicate with other nodes and/or entities in the wireless communication network. The network node 500 further comprises a memory 502 for storing data. Further, the network node 500 may comprise a control or processing unit (not shown) which in turns is connected to the different units 503-504. It shall be pointed out that this is merely an illustrative example and the network node 500 may comprise more, less or other units or modules which execute the functions of the network node.

It should be noted that FIG. 5 merely illustrates various functional units in the network node 500 in a logical sense. The functions in practice may be implemented using any suitable software and hardware means/circuits etc. Thus, the embodiments are generally not limited to the shown structures of the network node 500 and the functional units. Hence, the previously described exemplary embodiments may be realised in many ways. For example, one embodiment includes a computer-readable medium having instructions stored thereon that are executable by the control or processing unit for executing the method steps in the network node 500. The instructions executable by the computing system and stored on the computer-readable medium perform the method steps of the network node 500 as set forth in the claims.

In FIG. 6, the wireless device 600 is also illustrated comprising a communication unit 601. Through this unit, the wireless device 600 is adapted to communicate with other nodes and/or entities in the wireless communication network. The communication unit 601 may comprise more than one receiving arrangement. For example, the communication unit 601 may be connected to both a wire and an antenna, by means of which the wireless device 600 is enabled to communicate with other nodes and/or entities in the wireless communication network. Similarly, the communication unit 601 may comprise more than one transmitting arrangement, which in turn are connected to both a wire and an antenna, by means of which the wireless device 600 is enabled to communicate with other nodes and/or entities in the wireless communication network. The wireless device 600 further comprises a memory 602 for storing data. Further, the wireless device 600 may comprise a control or processing unit (not shown) which in turn is connected to the different units 603-604. It shall be pointed out that this is merely an illustrative example and the wireless device 600 may comprise more, less or other units or modules which execute the functions of the wireless device 600.

It should be noted that FIG. 6 merely illustrates various functional units in the wireless device 600 in a logical sense. The functions in practice may be implemented using any suitable software and hardware means/circuits etc. Thus, the embodiments are generally not limited to the shown structures of the wireless device 600 and the functional units. Hence, the previously described exemplary embodiments may be realised in many ways. For example, one embodiment includes a computer-readable medium having instructions stored thereon that are executable by the control or processing unit for executing the method steps in the wireless device 600. The instructions executable by the computing system and stored on the computer-readable medium perform the method steps of the wireless device 600 as set forth in the claims.

Figure 7:
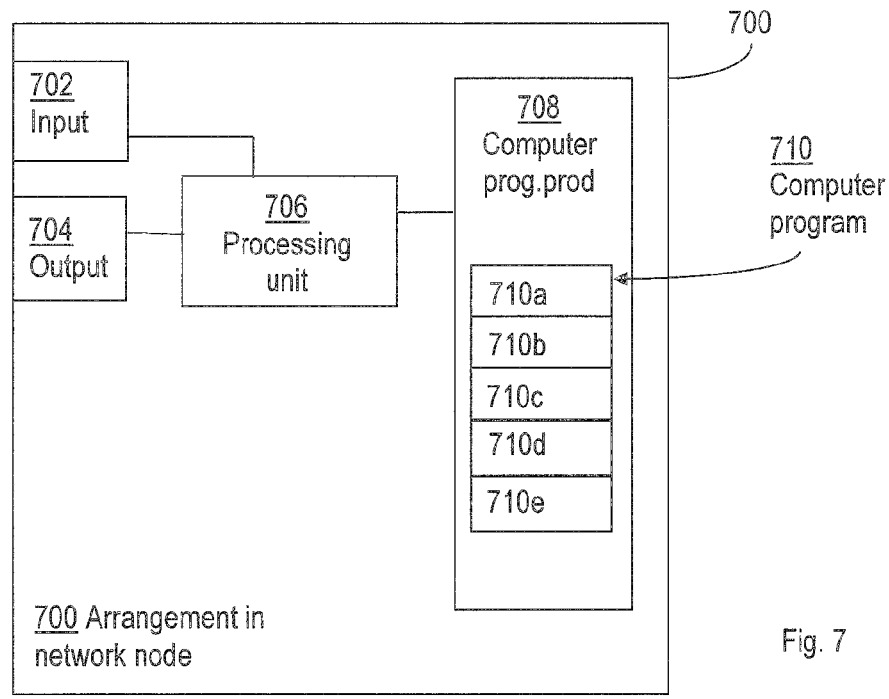
FIG. 7 is a block diagram of an arrangement in a network node in a wireless communication network employing heterogeneous frequency band types according to an exemplifying embodiment.

FIG. 7 schematically shows an embodiment of an arrangement in a network node 700. Comprised in the arrangement in the network node 700 are here a processing unit 706, e.g. with a DSP (Digital Signal Processor). The processing unit 706 may be a single unit or a plurality of units to perform different actions of procedures described herein. The arrangement in the network node 700 may also comprise an input unit 702 for receiving signals from other entities, and an output unit 704 for providing signal(s) to other entities. The input unit and the output unit may be arranged as an integrated entity as illustrated in the example of FIG. 5 and the communication unit 501.

Furthermore, the arrangement in the network node 700 comprises at least one computer program product 708 in the form of a non-volatile memory, e.g. an EEPROM (Electrically Erasable Programmable Read-Only Memory), a flash memory and a hard drive. The computer program product 708 comprises a computer program 710, which comprises code means, which when executed in the processing unit 706 in the arrangement in the network node 700 causes the network node to perform the actions e.g. of the procedure described earlier in conjunction with FIGS. 1a-1f.

The computer program 710 may be configured as a computer program code structured in computer program modules 710a-710e. Hence, in an exemplifying embodiment, the code means in the computer program of the arrangement in the network node 700 comprises a configuring unit, or module, for configuring a fallback carrier in the licensed frequency band to the wireless device, wherein if the network node determines that the wireless device should switch to the licensed frequency band. The computer program further comprises a hand-over unit, or module, for handing over the wireless device to the fallback carrier.

The computer program modules could essentially perform the actions of the flow illustrated in FIGS. 1a-1f, to emulate the network node 500. In other words, when the different computer program modules are executed in the processing unit 706, they may correspond to the units 503-504 of FIG. 5.

Figure 8:
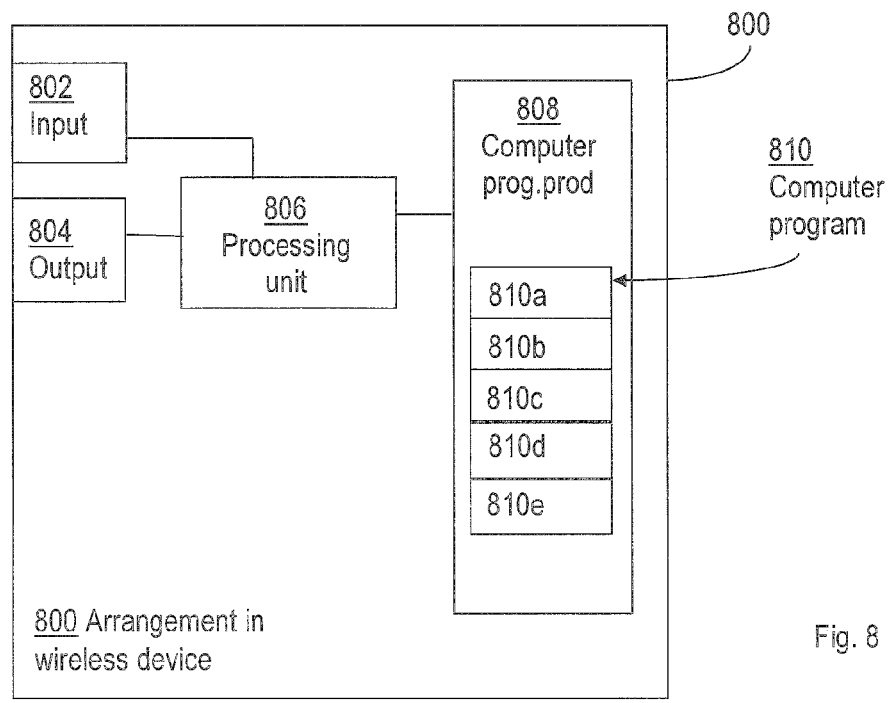
FIG. 8 is a block diagram of an arrangement in a wireless device operative in a wireless communication network employing heterogeneous frequency bands according to an exemplifying embodiment.

FIG. 8 schematically shows an embodiment of an arrangement in a UE. Comprised in the arrangement in the wireless device 800 are here a processing unit 806, e.g. with a DSP (Digital Signal Processor). The processing unit 806 may be a single unit or a plurality of units to perform different actions of procedures described herein. The arrangement in the wireless device 800 may also comprise an input unit 802 for receiving signals from other entities, and an output unit 804 for providing signal(s) to other entities. The input unit and the output unit may be arranged as an integrated entity as illustrated in the example of FIG. 6 and the communication unit 601.

Furthermore, the arrangement in the wireless device 800 comprises at least one computer program product 808 in the form of a non-volatile memory, e.g. an EEPROM (Electrically Erasable Programmable Read-Only Memory), a flash memory and a hard drive. The computer program product 808 comprises a computer program 810, which comprises code means, which when executed in the processing unit 806 in the arrangement in the wireless device 800 causes the arrangement in the wireless device 800 to perform the actions e.g. of the procedure described earlier in conjunction with FIGS. 2a-2c.

The computer program 810 may be configured as a computer program code structured in computer program modules 810a-810e. Hence, in an exemplifying embodiment, the code means in the computer program of the arrangement in the wireless device 800 comprises a receiving unit, or module, for receiving information from the network node comprising parameters comprising information pertaining to carrier frequency and band type. The computer program further comprises a selecting unit, or module, for selecting a carrier of a frequency band type offered by the network node to camp on based on the received information.

Figure 2B:
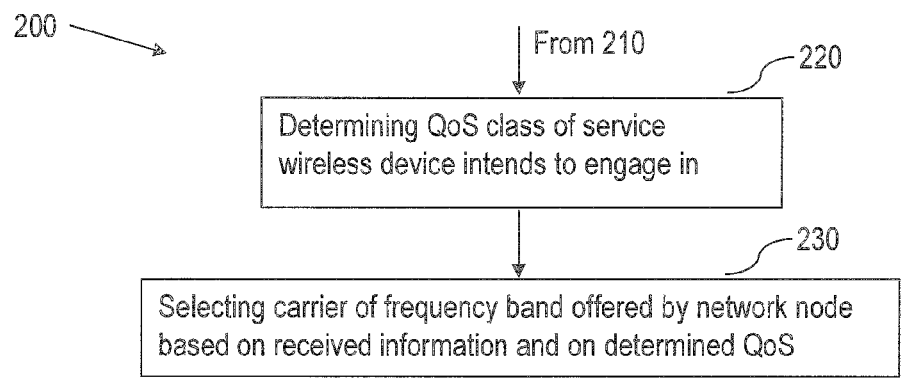
FIG. 2b is a flowchart of a method performed by a wireless device operative in a wireless communication network employing heterogeneous frequency bands according to still an exemplifying embodiment.
Figure 2C:
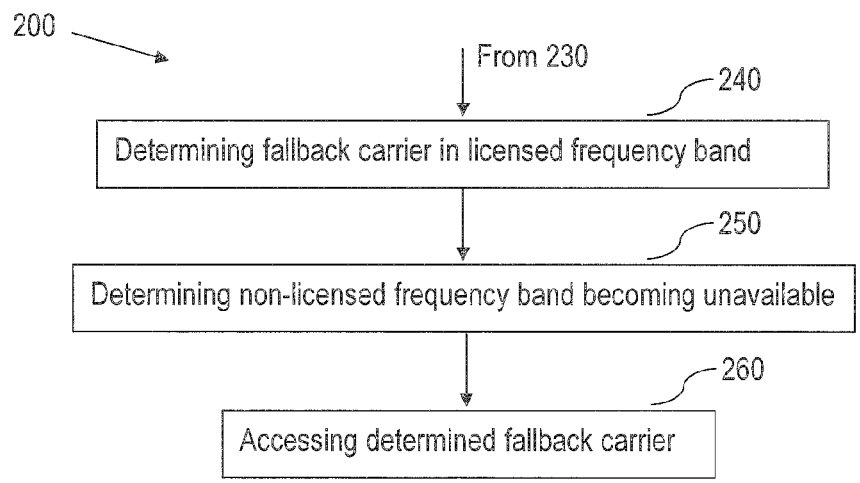
FIG. 2c is a flowchart of a method performed by a wireless device operative in a wireless communication network employing heterogeneous frequency bands according to yet an exemplifying embodiment.

The computer program modules could essentially perform the actions of the flow illustrated in FIGS. 2a-2c, to emulate the wireless device 600. In other words, when the different computer program modules are executed in the processing unit 806, they may correspond to the units 603-604 of FIG. 6.

Although the code means in the respective embodiments disclosed above in conjunction with FIGS. 5 and 6 are implemented as computer program modules which when executed in the respective processing unit causes the network node and the wireless device respectively to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the network node and the wireless respectively.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

What is claimed is:

1. A method performed by a network node in a wireless communication network employing heterogeneous frequency band types, the network node being operative to serve wireless devices in a non-licensed frequency band and in a licensed frequency band, the network node serving a wireless device in a non-licensed frequency band, the method comprising:

prior to determining that the non-licensed frequency band is or will be unavailable, configuring the wireless device with a fallback carrier in the licensed frequency band;

determining, by the network node, that the non-licensed frequency band is or will be unavailable and that the wireless device should switch to the licensed frequency band, wherein the determining that the non-licensed frequency band is becoming unavailable is based on a monitored pilot quality of the non-licensed frequency band has fallen below a threshold; and in response to determining by the network node that the non-licensed frequency band is or will be unavailable, the wireless device is prioritized before the second wireless device and that the wireless device should switch to the licensed frequency band, handing over the wireless device to the fallback carrier.

2. A method according to claim 1, wherein the fallback carrier is a predefined primary carrier.

3. A method according to claim 1, further comprising receiving, from the wireless device, a request for frequency band type of a carrier by means of which the wireless device is connected to the network node, wherein the method further comprises informing the wireless device of the frequency band type of the carrier.

4. A method according to claim 1, further comprising determining parameters comprising information pertaining to carrier frequency and band type supported by the network node, and signaling the determined parameters to wireless devices currently camping on the network node.

5. The method of claim 1, wherein the priority information is transmitted to the wireless device during an initial random access procedure.

6. A method performed by a wireless device operative in a wireless communication network employing heterogeneous frequency bands, the wireless device performing a random access control procedure to become connected to a network node, the method comprising:

receiving information from the network node, the information comprising parameters information pertaining to a carrier associated with the non-licensed frequency band and information pertaining to a fallback carrier associated with a licensed frequency band, selecting the carrier associated with the non-licensed frequency band to camp on based on the received information;

determining that the non-licensed frequency band is becoming unavailable, wherein the determining that the non-licensed frequency band is becoming unavailable is based on a monitored pilot quality of the non-licensed frequency band has fallen below a threshold; and in response to determining that the non-licensed frequency band is becoming unavailable, accessing the fallback carrier associated with the licensed frequency band.

7. The method of claim 6, wherein the priority information is received from the network node during an initial random access procedure.

8. A network node in a wireless communication network employing heterogeneous frequency band types, the network node being operative to serve wireless devices in a non-licensed frequency band and in a licensed frequency band, the network node serving a wireless device in a non-licensed frequency band, the network node comprising:

a processor and a memory, the memory comprising instructions which when executed by the processor causes the network node to:

prior to determining that the non-licensed frequency band is or will be unavailable, configure the wireless device with a fallback carrier in the licensed frequency band;

determine, by the network node, that the non-licensed frequency band is or will be unavailable and that the wireless device should switch to the licensed frequency band, wherein the determining that the non-licensed frequency band is becoming unavailable is based on a monitored pilot quality of the non-licensed frequency band has fallen below a threshold; and in response to the network node determining that the non-licensed frequency band is or will be unavailable that the wireless device should switch to the licensed frequency band, handing over the wireless device to the fallback carrier.

9. A network node according to claim 8, wherein the memory further comprises instructions which when executed by the processor causes the network node to determine parameters comprising information pertaining to carrier frequency and band type supported by the network node, and to signal the determined parameters to wireless devices currently camping on the network node.

10. A network node according to claim 8, wherein the memory further comprises instructions which when executed by the processor causes the network node to assign a first priority of the served wireless device in the non-licensed frequency band, the first priority being higher than a second priority assigned to a second wireless device engaged in an initial random access control procedure, wherein if the non-licensed frequency band becomes unavailable, the served wireless device is prioritized before the second wireless device with regards to the configured fallback carrier.

11. A network node according to claim 8, wherein the memory further comprises instructions which when executed by the processor causes the network node to identify a delay tolerant wireless device being served in the licensed frequency band, and to hand over the delay tolerant wireless device to the non-licensed frequency band.

12. The network node of claim 8 wherein the priority information is transmitted to the wireless device during an initial random access procedure.

13. A wireless device operative in a wireless communication network employing heterogeneous frequency bands, the wireless device performing a random access control procedure to become connected to a network node, the wireless device comprising:
  a processor and a memory, the memory comprising instructions which when executed by the processor causes the wireless device to:
    receive information from the network node the information comprising parameters information pertaining to a carrier associated with the non-licensed frequency band and information pertaining to a fallback carrier associated with a licensed frequency band;
    select the carrier associated with the non-licensed frequency band to camp on based on the received information;
    determine that the non-licensed frequency band is becoming unavailable,
      wherein the determining that the non-licensed frequency band is becoming unavailable is based on a monitored pilot quality of the non-licensed frequency band has fallen below a threshold; and
    in response to determining that the non-licensed frequency band is becoming unavailable, access the fallback carrier associated with the licensed frequency band.

14. A wireless device according to claim 13 wherein the memory further comprises instructions which when executed by the processor causes the wireless device to determine a Quality of Service, QoS, Class of a service the wireless device intends to engage in, wherein selecting the carrier of the frequency band type further is based on the determined QoS.

15. A wireless device according to claim 13, wherein determining that the non-licensed frequency band is becoming unavailable comprises determining that the wireless device has not been scheduled for a predetermined period of time.

16. The wireless device of claim 13, wherein the priority information is received from the network node during an initial random access procedure.

* * * * *